United States Patent [19]

Hauger et al.

[11] Patent Number: 4,650,177

[45] Date of Patent: Mar. 17, 1987

[54] RECORD SORTING

[75] Inventors: Josef Hauger; Werner Mädge, both of Villingen-Schwenningen; Paul Gille, Bad Dürrheim, all of Fed. Rep. of Germany

[73] Assignee: Kienzle Apparate GmbH, Fed. Rep. of Germany

[21] Appl. No.: 766,052

[22] Filed: Aug. 15, 1985

[51] Int. Cl.⁴ .............................................. B65H 39/10
[52] U.S. Cl. .................................... 271/305; 271/290; 271/303
[58] Field of Search ................. 271/289, 290, 303, 305

[56] References Cited

U.S. PATENT DOCUMENTS 2,990,956  7/1961  Wilson ............................. 271/305 X
3,874,653  4/1975  Welch ................................. 271/305
4,251,000  2/1981  Templeton ....................... 271/303 X Primary Examiner—Richard A. Schacher
Attorney, Agent, or Firm—Ralf H. Siegemund

[57] ABSTRACT

A sorting module is provided, having as its principal operative element a pivotable carrier for a plurality of guide rails, having at their front end funnel shaped entrance openings, cooperating with a narrower opening trough which records pass, for placement in between two guide rails the selection of which depends on step motor driven adjustment of the carrier. The guide rails together, with stationary walls lead to sorting compartments.

7 Claims, 4 Drawing Figures

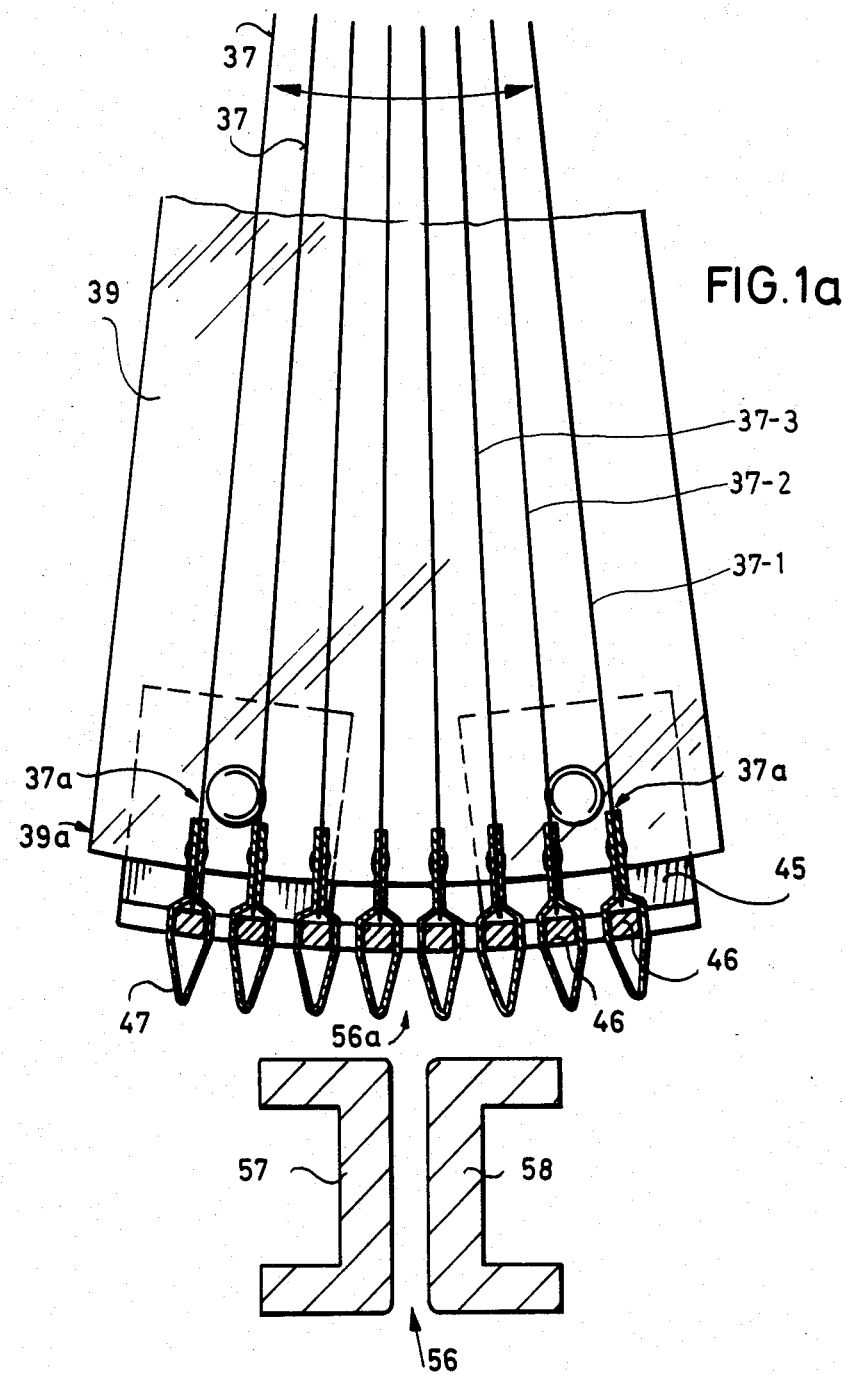

RECORD SORTING

BACKGROUND OF THE INVENTION

The present invention relates to sorting records and more particularly the invention relates to a module for such a purpose whereby the records are guided from an entrance in between flexible guide rails establishing individual sorting channels to individual record deposits, (shelves, compartments, etc.) whereby respective two, adjacent flexible guide rails establish a funnel shape inlet and by means of appropriate controls, individual funnels are selectable for obtaining sorting proper.

A sorting module of the type generally to which the invention pertains is known through German Printed Patent Application No. 12 77 597 (corresponding to U.S. application Ser. No. 732,920, filed May 5, 1958). Herein particularly, flexible guide rails are provided to face the entrance opening. The flexible guide rails are pivotably adjustable, so as to establish entrance or inlet openings through which records run, into channels as established by the guide rails, and towards an individual sorting shelf, deposit location, or the like. The control of the entrance ends of the flexible guide rails is provided in that at the entrance of each rail carries a printed on electromagnetic coil and the entire package of entrance exists as established by all of the guide rails, face permanent magnets which, depending upon the direction of current flow through the respective printed magnetic coils will either attract the ends of the guide rails or repel them.

The aforedescribed control of physical movement of the guide rails for purposes of sorting control is relatively complicated, because each of the guide rails has to be provided with electric connections for purposes of feeding electrical power to the respective printed-on magnetic coil. Also, the current flow through this coils have to be reversible.

Different types of sorting devices are described in German Pat. No. 12 23 596 and German Printed Patent Application No. 11 41 116. The devices described herein do not meet all of the various features outlined in the introduction. In particular, sorting devices are described in these references in which the deposit location and its feed structure are themselves controlled as to position vis-a-vis the entrance of the record. The device disclosed in the first German Printed Pat. Application No. 12 77 597 requires a relatively large entrance opening which means that the direction of movement of the arriving record at the entrance is, at least in some instances, laterally displaced to a considerable degree.

On the other hand the German Pat. No. 12 23 596 (see U.S. application Ser. No. 319,395 filed Oct. 28, 1963) requires basically steps for controlling the motion and placement of the particular type of strip like records which steps are in turn provided at the record themselves so that the selection of a record occurs through spreading adjacent records apart and in opposite direction and a removal occurs in and through the open gap.

The German Printed Pat. Application No. 11 41 116, also mentioned above, uses as a sorting implement several roller pairs, each pair forming a gap to be aligned respectively with a radial slot in a rotatable drum. Unfortunately in practice one encounters here certain tolerances which interfere with the reliability of the operation; it may be difficult or impossible at times to insert a record when the transport speed is high.

DESCRIPTION OF THE INVENTION

It is an object of the present invention, to provide a new and improved device for sorting records using flexible guide rails but in an environment which is less expensive than the prior art devices, whereby particularly funnel shaped entrances can be easier arranged and provided for receiving the respective records to be sorted.

In accordance with the preferred embodiment of the present invention, the object is attained, in that flexible guide rails are arranged on a common carrier; at their entrance ends, they establish funnel shaped entrance slots facing a narrower stationary opening through which the records to be sorted arrive; the carrier is adjusted by means of a step motor being controlled such that the respective funnel shaped entrance slot of a selected path between respective two rails is caused to face that stationary opening. The rear of the guide rails cooperate with channels that lead to sorting compartments.

This construction is simple and therefore quite reliable. Particularly the control of the carrier for channel selection is quite simple, particularly on account of the step wise movement of the carrier as imparted by the step motor. In view of the relationship between the openings tolerances can be compensated quite easily.

In accordance with a further feature of the invention, the carrier is provided its entrance side with comb like projections, being associated with the individual guide rails, and a connection is established between the rails and these projections through V-shaped guide pieces. The outer surfaces of adjacent V-shaped guide pieces establish the respective funnel for an entrance slot. It is of advantage here, to provide the guide pieces with electrical sensors, pick-ups or detectors for sensing absence or presence of any record for purposes of control of record movement. Another improvement is to be seen in that the carrier at its end facing away from the entrance is provided with a tooth segment engaging a pinion that is driven by the step motor.

The carrier is provided with a slotted disk for providing a representation of its position so that a suitable scanner can ascertain these positions. This ascertainment and pick-up is used in tracking control of moving and adjusting the carrier with the guide rails thereon. The flexible guide rails are situated loosely between outer walls limiting the guide path and establishing at the same time the exits towards the individual deposit or shelves.

Another feature of the invention is to be seen that the flexible guide rails and the guide walls are provided with perforations to accommodate rollers for moving the records. A central guide rail runs records to an exit which in turn is constructed to be connected to another, similar sorting unit so as to establish a hierarchy of sorting operations. The deposit shelves each have their own drive which permit plug in connections with respect to the particular sorting module.

DESCRIPTION OF THE DRAWINGS

While the specification concludes with claims particularly pointing out and distinctly claiming the subject matter which is regarded as the invention, it is believed that the invention, the objects and features of the invention, and further objects, features and advantages thereof will be better understood from the following description taken in connection with the accompanying drawings in which:

FIG. 1a is a similar view of a detail but drawn to an enlarged scale and showing particularly the various entrances for the sorting device;

Figure 1:
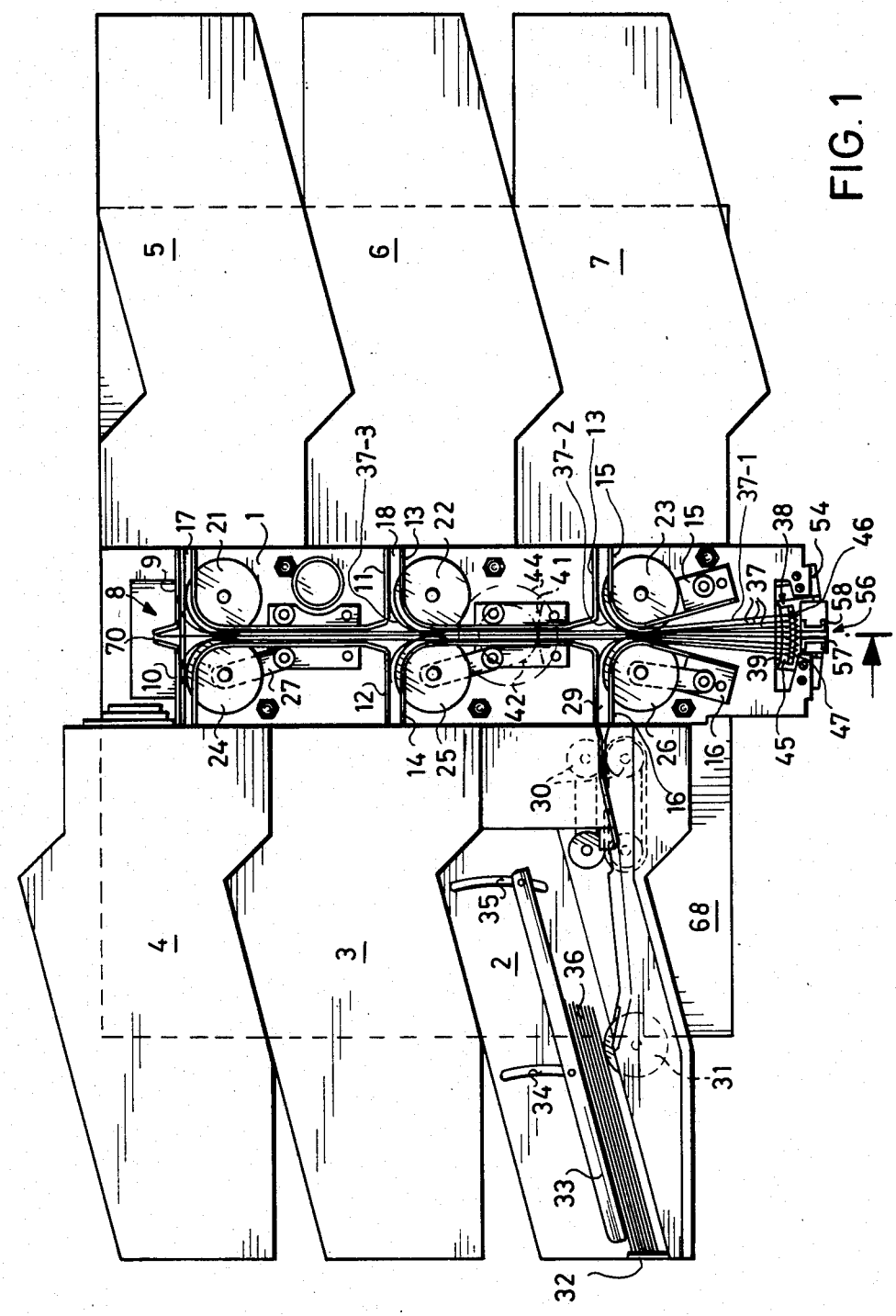
FIG. 1 is a top view of the entire sorting module constructed in accordance with the preferred embodiment of the present invention for practicing the best mode thereof.

Proceeding now to the detailed description of the drawings. The overall organization can best be taken from FIG. 1 and it is assumed here that the view is into the module; an upper casing cover having been removed. Accordingly there is visible a support frame 1 establishing also a platform surface in horizontal direction, so that the records so to speak stand and move on the surface, in that they extend in directions perpendicular to the plane of the drawing of FIG. 1. The frame 1 moreover serves as support for individual deposit shelves or compartments 2, 3, 4, 5, 6 and 7. For ease of illustration only one of these shelves or compartments, namely the one identified by reference numeral 2 shows also various details and interior structure and it will be appreciated that similar details are included in all of the other compartment or shelves.

The compartments 2 through 7 are arranged to both sides of a general record path 8 and platform 1 and this path is partitioned by means of guide walls 9, 10, 11, 12, 13, 14, 15, and 16 establishing multiple channels that lead into these compartments. The guide walls 9 and 11 together establish for example an exit opening 17 for records to be deposited in compartment 5. The guide walls 11 and 13 establish an exit open 18 for records destined to compartment 6 and so forth. These walls generally establish channels that lead to the various compartments.

The guide walls 11, 13 and 15 are provided with perforations 20 (see for example FIG. 2) through which rollers 21, 22 and 23 can project into the guide path 8. These rollers force a record against pressure pulleys or rollers 24, 25 and 26 respectively, so as to accomplish movement of the record through the device. Accordingly recesses 20 are provided for them in the respective other guide walls, 12, 14 and 16. The pressure pulleys or rollers 24, 25 and 26 are journalled on pivot levers 27 (see FIG. 2 for details), and springs 28 cause the rollers 24, 25 and 26 to respectively be urged against the drive rollers or capstan pulleys 21, 22, and 23.

The rollers 21, 22 and 23 are driven in unison through a common drive which is not shown. The arrangement of various rollers in the recesses 20 of the guide walls 11 through 16 is such that they will not only be effective in the path 8 for moving the records, but also in the vicinity of the exit openings such as 17 and 18. Accordingly the drive rollers are indeed effective for driving records into the opening 17, or 18 or others.

As stated, the compartment 2 is fed by the channel established between the specific guide walls 14 and 16 having and establishing an exit opening 29 for directing records into that compartment 2. This compartment is shown in greater detail. Records which leave the module through sorting opening 29 are engaged by drive and pressure pulleys 30 for movement into the compartment 2. Analogous operation of course occurs with respect to the other compartments. As stated compartment 2 is described and illustrated in greater detail and one can see that there is also provided another drive roller 31 for urging the record against a stop 32. A A pressure plate 33 is guided in slots 34 and 35 to engage resiliently the records 36 from the side opposite to the zone of receiving being located adjacent roller 31.

In accordance with the principle feature of the invention flexible guide rails 37 are loosely deposited, generally in the path 8 and particularly with their ends between the guide walls 9 through 16. FIG. 1a shows these guide rails in detail and in pairs they define guide spaces in between becoming parts of guide channels defined by the walls and leading into the sorting compartments. The guide rails 37 have entrance ends 37a and here they are combined in a bundle 38. Each of the guide rails 37 cooperates with walls that terminate in one of the compartment 2 through 7 so that records such as 36 will be transported first between two guide rails 37 and thereafter one guide rail 37 and one of the walls 9 through 16 for placement in the respective compartment. One can see for example that in each instance a guide rail 37 ends in the vicinity of the exit openings such as 17, 18 and 29. By way of example and comparing FIGS. 1a with 1, the rightmost guide rail 37/1 and the next rail 37/2 establish a first channel. The guide rail 37/1 is shown in tangent relationship to the wall 15, while a curved portion of sheet 37/2 ends tangent to the lower end of wall 13. Hence the drive pulley 23 in cooperation with the pressure pulley 26, moves a record sheet that has entered the channel between the guide rails 37/1 and 37/2 towards the compartment 7, whose entrance is established by the lower end of wall 13 as per FIG. 1 and the respective adjacent end of wall 15. A record entering the channel between the rail 37/2 and the rail 37/3 is moved by the drive pulley 23, past the entrance that leads to compartment 7 and in between the gap established by the long extension of wall 13 as per FIG. 1 and that rail 37/3 which extends parallel thereto but ends tangent to the lower portion of wall 11 in FIG. 1. Thus such a sheet will be moved towards the entrance 18 of the compartment 6. The arrangement for the other compartments is an analogous one.

Another guide rail 37 runs to exit opening 70, so that a particular record can actually pass along that middle guide rail, so as to traverse the entire module. Another sorting module being constructed similar to the one illustrated may be connected with its entrance opening to this central exit opening 70 of the module illustrated. It can thus be seen that multiple modules can be combined in a hierarchical fashion to enlarge the scope of sorting. The guide rails 37 are made of flexible sheet metal strips and are also provided with recesses 20 in parts and as mentioned above they permit traversal by the various rollers 21 through 26 so that any record can be engaged always by a pair of drive and pressure pulleys, such as 23 and 26 irrespective in which channel, i.e. between which guide rails the record actually moves.

Figure 2:
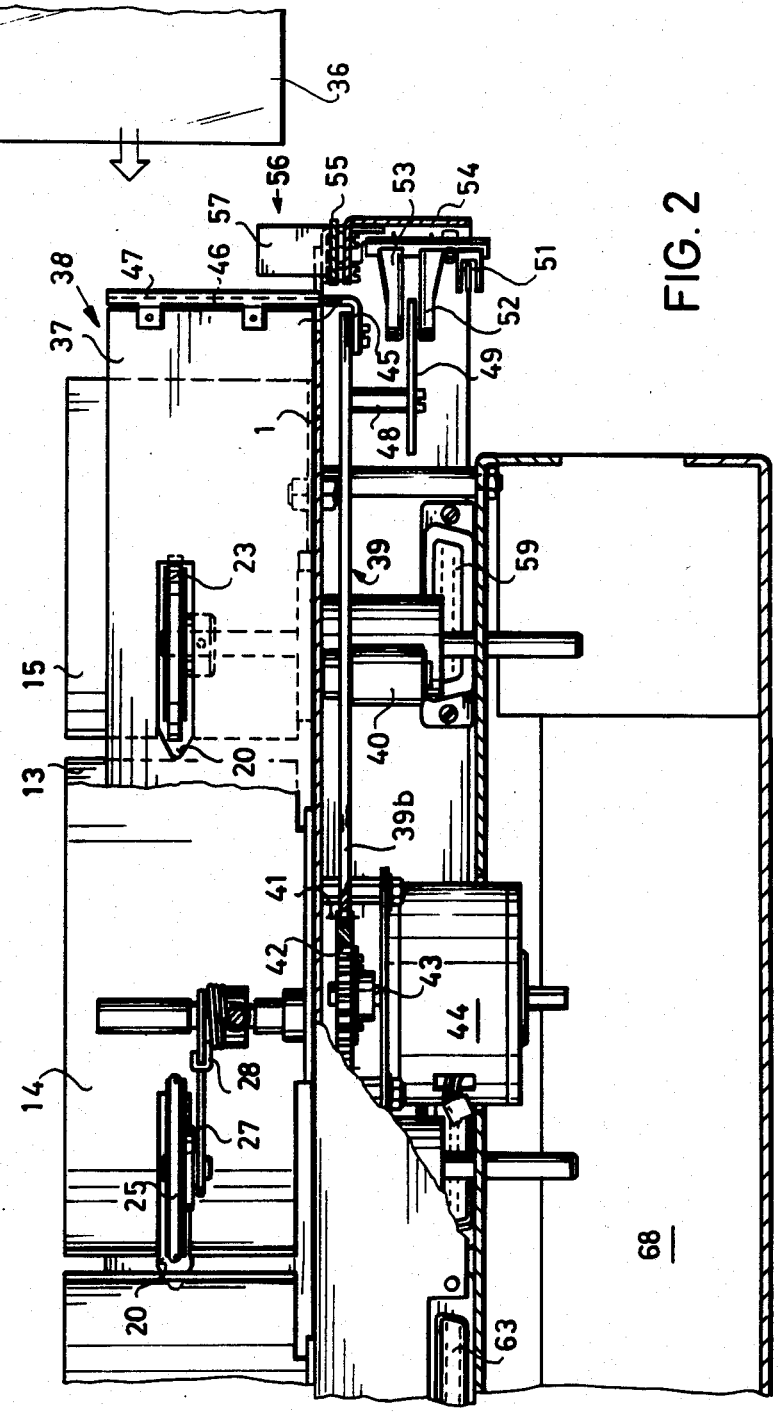
FIG. 2 is a vertical section view in longitudinal direction through this sorting module shown in FIG. 1.
Figure 3:
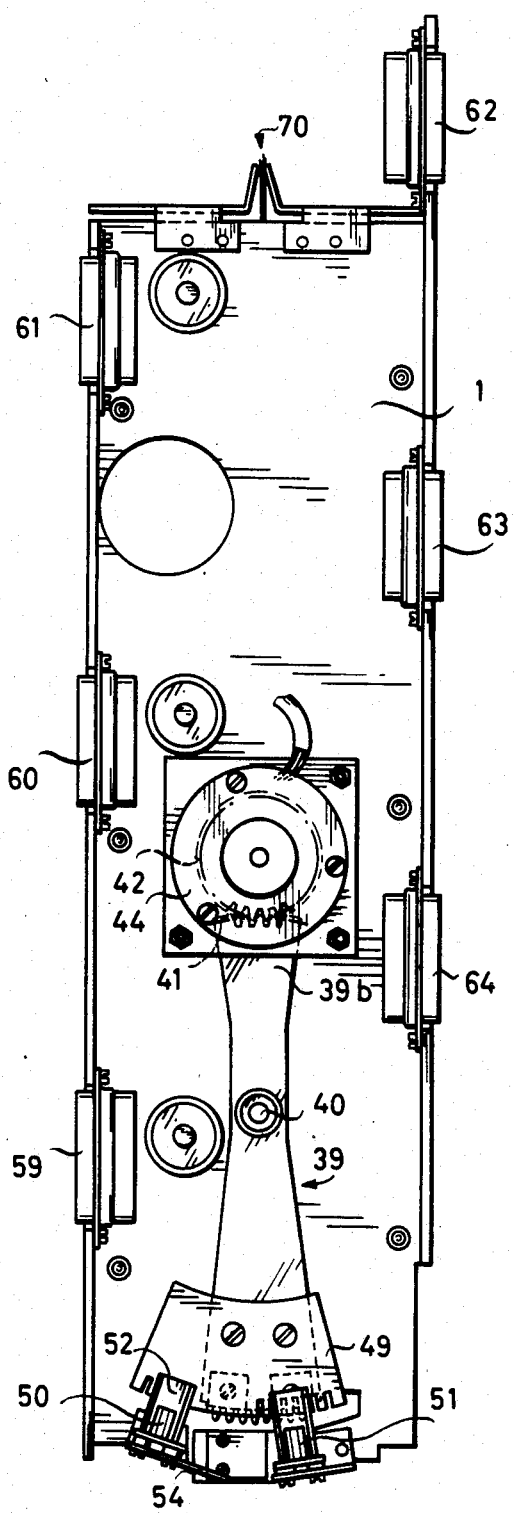
FIG. 3 is a bottom view of the same sorting module.

A carrier 39 is provided under the frame 1 and this carrier 39 is mounted for pivoting on an axis 40. The left end 39b of the carrier 39 is provided with a toothed segment 41 meshing a gear or pinion 42. The gear or pinion 42 sits on a shaft 43 to be driven by a step motor 44, shaft 43 being the output shaft of that step motor accordingly. The motor 44 is fastened and secured to the frame 1. A comb like part 45 is connected to the carrier 39. This comb like 45 is provided with projections 46, being individually associated with the individual guide rails 37. The connection between any one of the guide rails 37 and the respective associated projection 46 of the comb like part 45 is accomplished through V-shaped bent guide pieces 47. Each guide piece 47 thus connects a comb projection 46 with one of the guide rails 37. The outer surfaces of the V-shaped guide piece 37 serve as respective funnel elements, such a funnel being respectively established between two adjacent guide pieces on respective two adjacent guide rails 37. Each guide rail 37 is for example connected at the entrance end 37 a to the respective associated guide piece at two different spots which is shown in FIG. 2.

The relationship in the range of the overall, stationary entrance opening 56 of the sorter are shown on an enlarged scale in FIG. 1. The carrier 39 has an end 39a adjacent to the entrance and inlet of the module and the comb like part 45 with its projections 46 are connected to the carrier at that end. The guide pieces 47 form in pairs entrance slots 56a being wider in each instance as a relatively narrow stationary opening 56.

A position defining, slotted disk 49 is fastened by means of a spacer pin 48 to the carrier 39. This slotted disk and cooperates with stationary sensors 50 and 51 in order to ascertain the position of the disk 49 and therefore of the carrier 39 as well as of the bundle 38 of guide rails 37. This way one obtains the requisite step pulses for controlling the step motor 44. The sensors 50 and 51 are in each instance comprised of a source of radiation or the like 52 and of a receiver 53. The slots and comb like bars in turn alternatingly open and close the light pull between source 52 and receiver 53, so that position defining pulses are derivable therefrom. These elements 52 and 53 are fastened to a mounting element 54, which in turn is connected and secured to frame 1.

A small, printed circuit board 55 is likewise connected to the carrier and mounting part 54. This circuit board 55 carries guide pieces 57 and 58 which establish the entrance opening 56 whereby the guide pieces 57 and 58 each carry electrical feelers or sensors, responding to absence or presence of a record in between. The overall control in turn is accommodated on an electrical printed circuit board being arranged in a casing or housing 68 which in turn is arranged under the frame 1.

Since as already mentioned, the individual compartments 2 through 7 are each provided with their own drive for the record it is quite possible to just plug them in by means of plug connections 59, 60, 61, 62, 63 and 64 and to thereby connect these drives with the sorting module. This way then permits bearing of the individual compartments 2 through 7 on the frame 1.

The operation of the sorting device in accordance with the invention, will now be summarized with emphasis on those aspects which are no immediately apparent from the description of the various components above. The records 36, may arrive from a record encoding device and pass through the entrance opening 56 between the guide elements 57, and 58. Previously the code was read in some fashion and in this way it was ascertained through scanning what kind or type of record passes; this information is signaled to the control. The control on the other hand has already adjusted the bundle 38 of guide rails 37, by means of the step motor 44, such that the bundle 38 of guide rails 37 has a disposition so that a particular funnel shaped entrance slot 56a between respective two V-shaped guide pieces 47 is adjusted to face the opening 56. This selection is made so that the particular record 36 enters the proper location within the bundle 38 of guide rails and is now guided to the selected shelf or compartment 2 through 7. The record will in particular be guided in between guide rails 37 and thereafter between adjacent guide walls from the group of walls 9 through 16. During the transport in any of instances, a record 37 is driven by one or the other of the drive rollers 21, 22 or 23 cooperating with the respective pressure rollers 24, 25 and 26.

In some cases none of the shelves or compartments 2 through 7 has been selected so that the respective record is just to pass through, for example towards a second sorting module being connected to the through passage end 70.

The invention is not limited to the embodiments described above, all changes and modifications thereof not constituting departures from the spirit and scope of the invention are intended to be included.

We claim:

1. Apparatus of modular construction for sorting records comprising:

stationary wall means constituting feed and entrance channels for a plurality of sorting compartments;

a moveable and displaceable carrier element, disposed in relation to said channels and said compartments;

a plurality of flexible guide rails being mounted with one end each on said carrier and establishing a plurality of guide spaces and funnel shaped entrance slots and cooperating with said channels, and their respective other ends provided for permitting guiding individual records that have entered in between two of the flexible rails, through one of the channels into the respective compartment;

drive means for moving said carrier thereby moving said guide rail ends in unison; and a stationary entrance opening being narrower than each of said funnel shaped entrance slots, and being disposed in relation to said carrier, so that each of said funnel shaped slots can be aligned with said stationary opening, by operation of said carrier being driven by said drive means.

2. Apparatus as in claim 1, wherein said carrier has comb-like projections on one end, associated respectively with said guide rails, and V-shaped guide pieces being fastened to said comb-like projections being also fastened to the ends of said guide rails and establishing said funnel shaped entrances.

3. Apparatus as in claim 1, said carrier having on an end, facing away from said stationary entrance, a toothed segment, meshing a pinion, said pinion being driven by said drive means.

4. Apparatus as in claim 1, said carrier being provided with a position indicating marking track cooperating with stationary sensor means for ascertaining the disposition of said carrier element in representation of the selection of a funnel shaped opening and channel with regard to its position vis-a-vis said stationary opening.

5. Apparatus as in claim 1, wherein said channels are established by guide walls, said flexible rails being disposed in between said guide walls.

6. Apparatus as in claim 5, said guide rails and said walls being provided with perforations, there being drive and pressure pulleys journalled on a stationary part, traversing said openings, for purposes of gripping in pairs a record being moved into one of the spaces between two adjacent guide rails.

7. Apparatus as in claim 1, having a particular opening, one of the guide rails disposed to guide a record from said entrance to said exit opening, provided for connection to another similar modular sorter.

* * * * *